United States Patent [19]

Tateisi et al.

[11] Patent Number: 4,678,895
[45] Date of Patent: Jul. 7, 1987

[54] SYSTEM FOR MAKING PAYMENTS FOR TRANSACTIONS

[75] Inventors: Kazuma Tateisi, Ukyo; Yoshitsugu Shinohara, Shiga, both of Japan

[73] Assignee: Omron Tateisi Electronics Co., Kyoto, Japan

[21] Appl. No.: 545,912

[22] Filed: Oct. 27, 1983

[30] Foreign Application Priority Data

Oct. 29, 1982 [JP] Japan .................... 57-191048

[51] Int. Cl.⁴ .............................................. G06F 15/30
[52] U.S. Cl. ...................................... 235/379; 235/380
[58] Field of Search ........................................ 235/379

[56] References Cited

U.S. PATENT DOCUMENTS

| | | | |
|---|---|---|---|
| 3,971,916 | 7/1976 | Moreno | 364/200 |
| 4,068,213 | 1/1978 | Nakamura | 235/381 |
| 4,172,552 | 10/1979 | Case | 235/379 |
| 4,270,042 | 5/1981 | Case | 235/379 |
| 4,277,837 | 7/1981 | Stuckert | 364/408 |

FOREIGN PATENT DOCUMENTS 1019702 3/1964 United Kingdom .

*Primary Examiner*—Harold I. Pitts
*Attorney, Agent, or Firm*—Stevens, Davis, Miller & Mosher

[57] ABSTRACT

A payment making system comprises an electronic cash register and a payment making terminal device connected to the register and is adapted for use with a bank card issued by a bank to a person having a deposit account with the bank. The bank card has recorded therein at least data relating to the account number of the holder of the card, data relating to the bank where the account is opened and data for identifying the holder. The case register comprises a keyboard for entering data relating to goods and including the prices of the goods and a first card reader for reading the data in the bank card and calculates the total sum of the prices entered as the sum payable. The terminal device is connected to and communicates with a control center provided with a file having stored therein data relating to the accounts of users and stores and with the function of transferring sums payable from users' account to stores' accounts. The terminal device comprises a first memory for storing paired data transferred from the cash register and including the bank card data and sums payable and a second card reader for reading the data recorded in the bank card. The paired data including the card data in match with the data read by the second card reader is retrieved from the first memory. The data relating at least to the account number of the user and the sum payable which are included in the paired data retrieved, and data prestored and relating to the store's account number are set to the control center.

12 Claims, 13 Drawing Figures

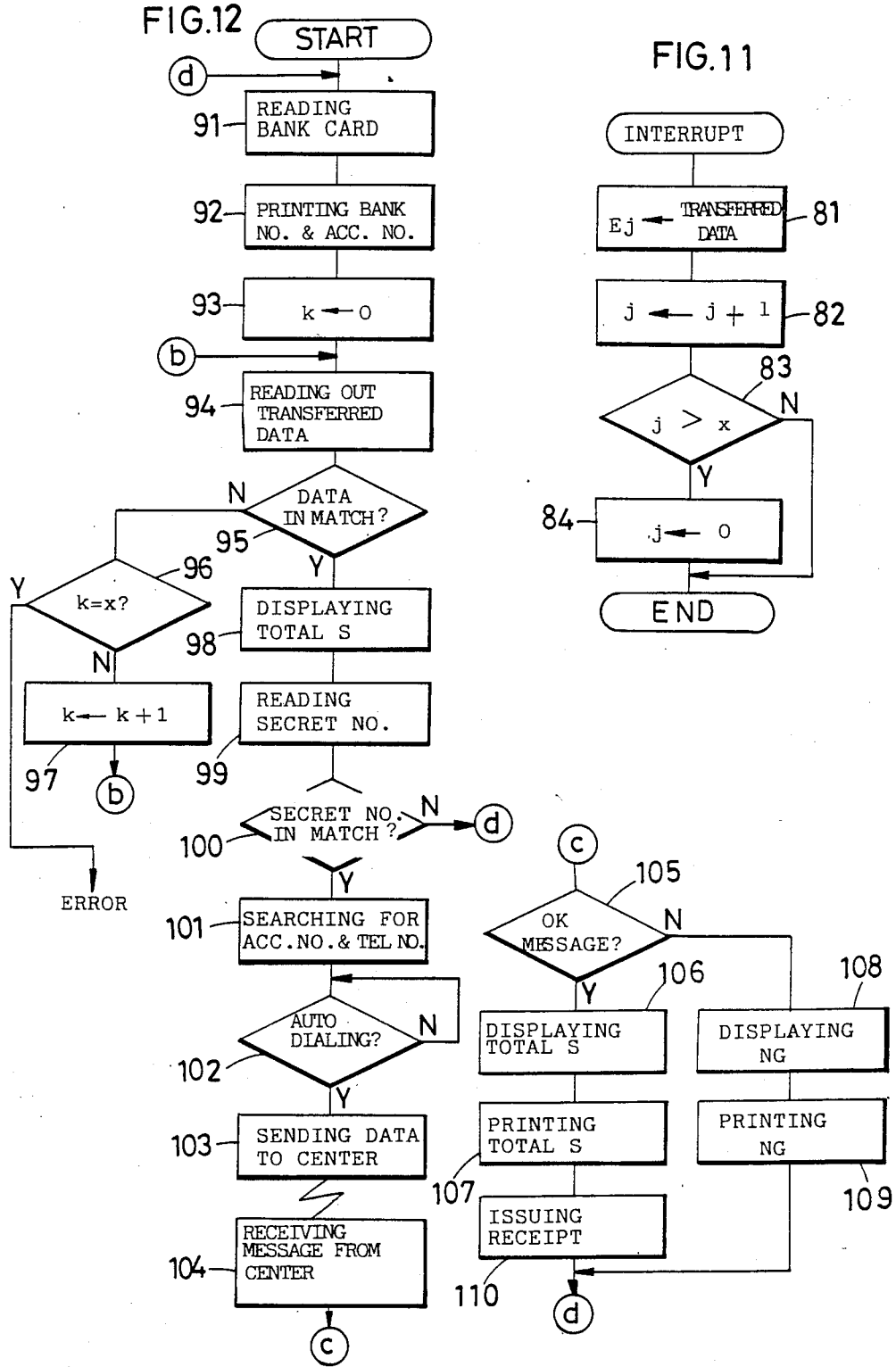

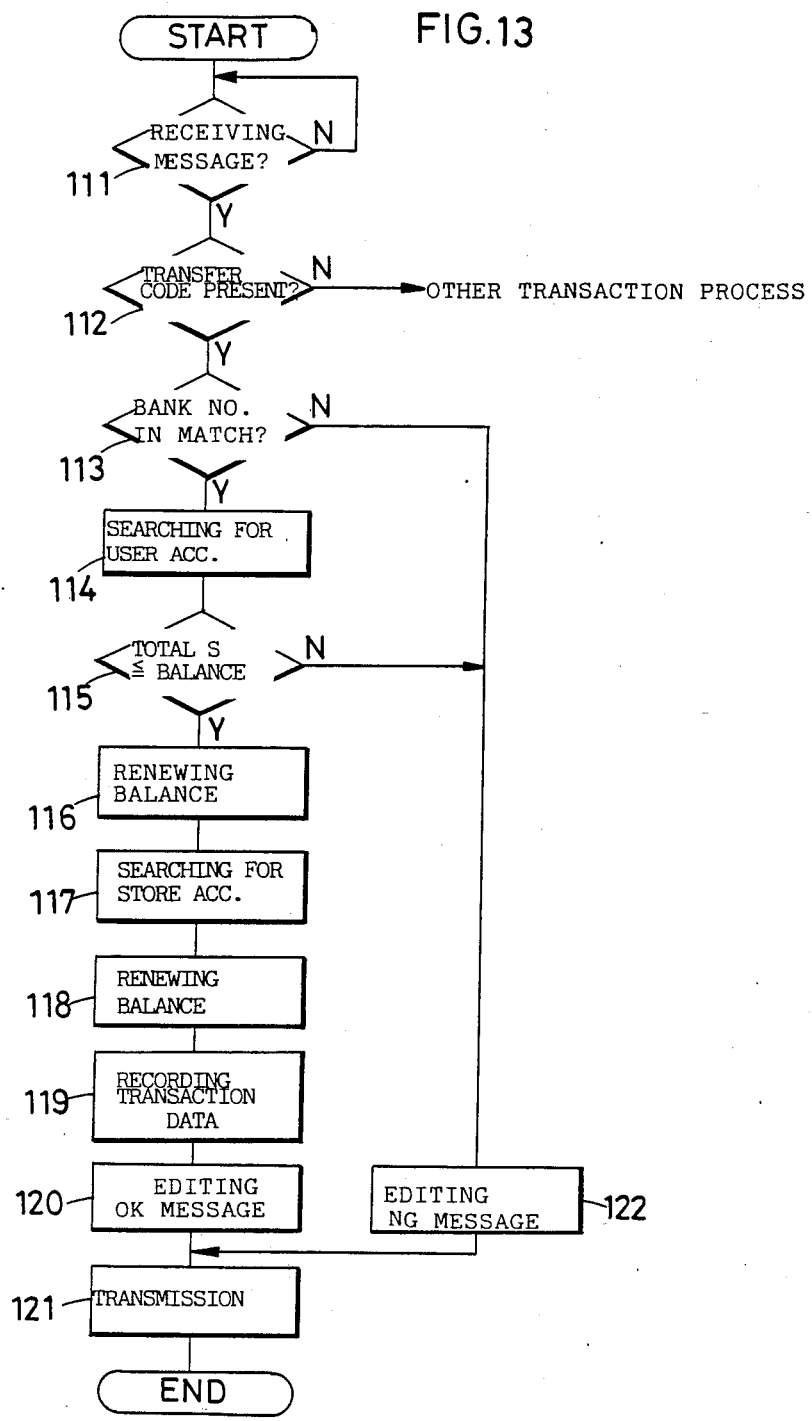

SYSTEM FOR MAKING PAYMENTS FOR TRANSACTIONS

BACKGROUND OF THE INVENTION

The present invention relates to a system for making payments for transactions, and more particularly to a system for a person having a deposit account with a bank to make payments for transactions with use of a bank card issued by the bank.

Payments for transactions are presently made chiefly with use of cash, checks, credit cards, etc. Although payments can be made most reliably with cash, checks and credit cards are frequently used in view of the risk of carrying a large amount of cash and the convenience that transactions can be performed without cash. However, since the payments with checks and credit cards for transactions must eventually be executed at banks or credit companies, such financial institutions, especially banks, require a larger amount of labor for carrying out a greater amount of clerical work for payments with an increase in the amount of such credit transactions. Further when checks and credit cards are used at the payment counter of stores and supermarkets, there arises another problem in that the clerk is unable to offer satisfactory service to many customers owing to congestion because checks and such cards take a considerable period of time for handling.

SUMMARY OF THE INVENTION

An object of the present invention is to provide a system for making payments for transactions which does not necessitate much labor as required for clerical work for executing payments for credit transactions involving the use of checks or credit cards and which is unlikely to cause congestion at the payment counter.

The payment making system of the present invention comprises an electronic cash register and a payment making terminal device connected to the register and is adapted for use with a bank card issued by a bank to a person having a deposit account with the bank. The bank card has recorded therein at least data relating to the account number of the holder of the card, data relating to the bank where the account is opened and data for identifying the holder. The electronic cash register comprises means for entering data relating at least to the prices of goods, means for calculating the total sum of the prices entered as the sum to be paid and a first card reader for reading the data in the bank card. The payment making terminal device is connected to and communicates with a control center provided with a file having stored therein data relating to the accounts of users and stores and with the function of transferring sums payable from the accounts of users to the accounts of stores. The terminal device comprises first memory means for storing paired data transferred from the electronic cash register and including the bank card data and sums payable, a second card reader for reading the data recorded in the bank card, means for searching the first memory means for the paired data including the card data in match with the data read by the second card reader, second memory means having stored therein data relating to the account numbers of the stores, and means for transmitting to the control center the data relating at least to the account number of the user and the sum payable and included in the paired data retrieved and the data relating to the account number of the store and read out from the second memory means.

The transaction payment making system of the invention is useful for transactions of all goods ranging from foods to motor vehicles (and also including intangible services). Accordingly the term "store" herein used refers to stores and supermarkets selling various usual goods, food and beverage stores such as restaurants, transport companies and the like offering services, etc. The term "user" means a person having a deposit account with a bank, possesses a bank card issued by the bank for the account and liable to make a payment to a store for the goods or service purchased from or given by the store. Electronic cash registers include terminals for point-of-sale systems.

Each store also has an account with a bank. When the users have their accounts with the bank where the stores have their accounts, the system of the invention has the simplest construction. To serve many users, the store preferably has a deposit account with each of a plurality of banks. In this case, the second memory means has stored therein data relating to the account numbers of the store in corresponding relation to the plurality of banks individually, and based on the data recorded in the bank card and relating to the bank, the account concerned is selected. The terminal device then communicates with the control center of the bank concerned. When the user's bank is different from the store's bank, the control centers of these banks are interconnected by a communication line for transmitting transaction data from one center to the other center.

The total sum of the prices of the goods purchased by the user is calculated by the electronic cash register, and the sum payable is transferred to the terminal device along with the bank card data. Preferably the terminal device is located at a small distance from the cash register. The sum payable and data relating to the accounts of the user and the store are sent from the terminal device to the control center. Based on the data, the control center executes a process for withdrawing the sum payable from the user's account and transferring the same to the store's account. When the transfer procedure is immediately executed, the data relating to the transfer procedure completed is sent to the terminal, which prints the data on a record, e.g., a slip as a receipt.

The electronic cash register almost always performs the usual register work only, while the payment is executed by the terminal device, so that the register work is separated from the payment process. This eliminates the likelihood of congestion in the vicinity of the payment counter. Since the terminal device directly executes the payment without any intervening clerical work at the bank, there is no need for the bank to perform payment clerical work, hence savings in labor.

The data transferred from the electronic cash register to the terminal device is temporarily stored in the first memory means in the terminal device, which in turn reads the bank card data and determines which item of data should be handled for payment based on the reading. Accordingly, even if the cash register and the terminal device differ in processing time or in the order in which the users are handled, payment processes can be executed without errors.

BRIEF DESCRIPTION OF THE DRAWINGS

FIG. 9 shows a format of the message to be sent to the control center;

FIG. 11 and FIG. 12 are flow charts showing the processing procedures to be followed by the terminal device; and FIG. 13 is a flow chart showing the processing procedure to be followed by the control center.

DESCRIPTION OF THE PREFERRED EMBODIMENT

Figure 1:
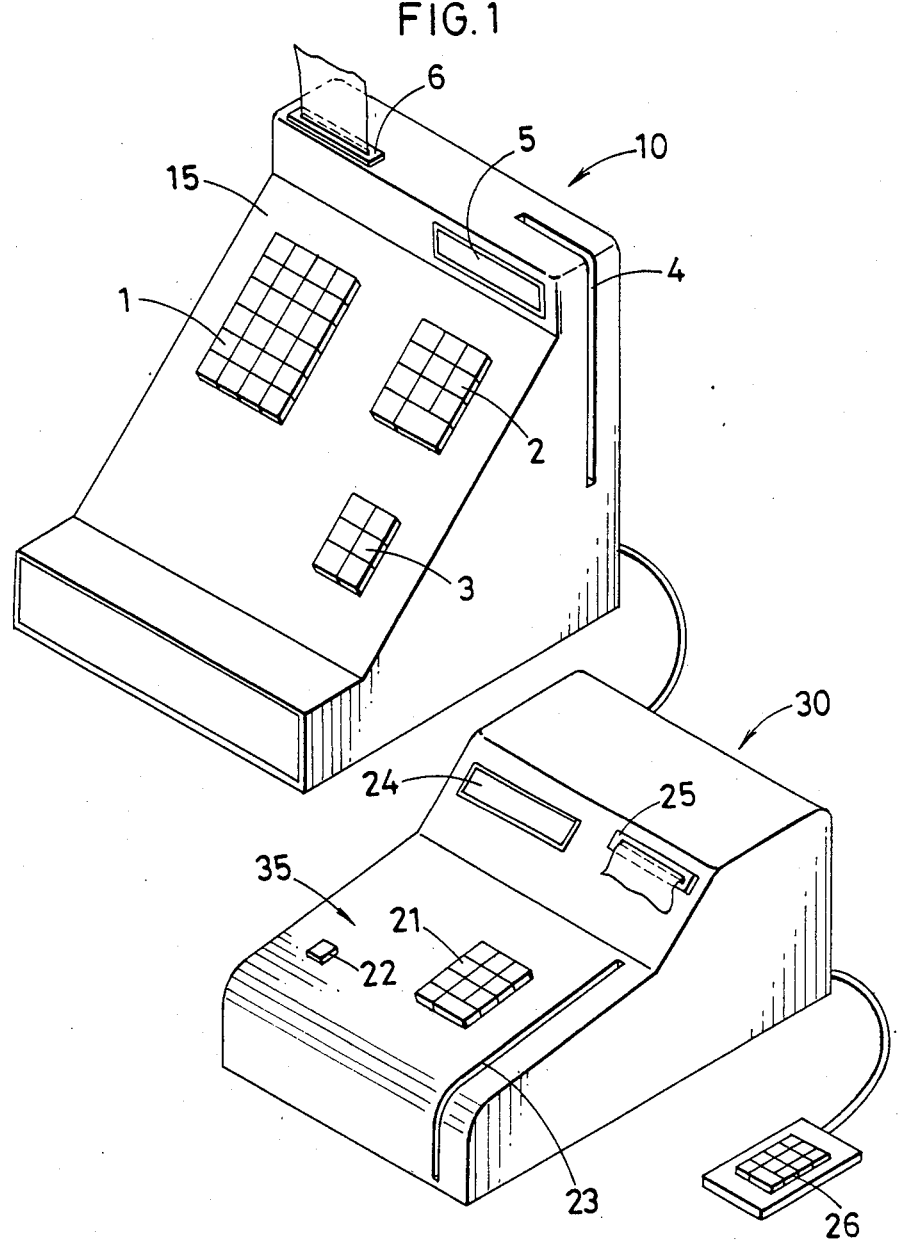
FIG. 1 is a perspective view showing a system for making payments for transactions.

FIG. 1 shows an embodiment of payment making system in its entirety. The system comprises an electronic cash register 10 and a payment making terminal device 30. The cash register 10 has a keyboard 15 including goods keys 1 for entering kinds or groups of goods, numerical keys (ten-key arrangement) 2 for entering the prices of goods, and function keys 3 including a total key, yen key, etc. The cash register 10 is further provided with a manual scanning groove 4 for bank cards, a display 5 for showing transaction data such as the kinds and prices of goods keyed in, total sums calculated, etc., and an outlet 6 for delivering receipts having transaction data printed thereon.

The terminal device 30 is provided with a keyboard 35 including a ten-key arrangement 21 and an automatic dial key 22, a manual scanning groove 23 for bank cards, a display 24 for showing total sums and other information, and an outlet 25 for delivering receipts having payment data (transfer data) printed thereon. The terminal device 30 has a keyboard 26 for entering secret numbers which is separate from the main body of the terminal device 30 and is connected to the device by a cord, because the secret number relating to each bank card is entered by the user although the terminal device 30 is manipulated generally by the clerk of the store and further because the secret number must be held confidential. The electronic cash register 10 and the terminal device 30 are interconnected. Such systems for making payments for transactions are installed in stores.

Figure 2:
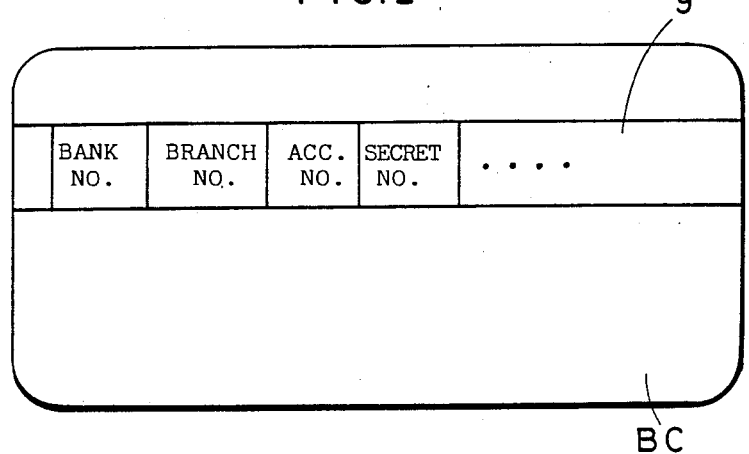
FIG. 2 shows a bank card.

FIG. 2 shows the bank card BC, which is issued by a bank to a person having an account with the bank. The card BC has affixed thereto a magnetic stripe 9 which has magnetically stored therein a bank number designating the bank, a branch number, the account number and secret number of the card holder, and other data.

Figure 3:
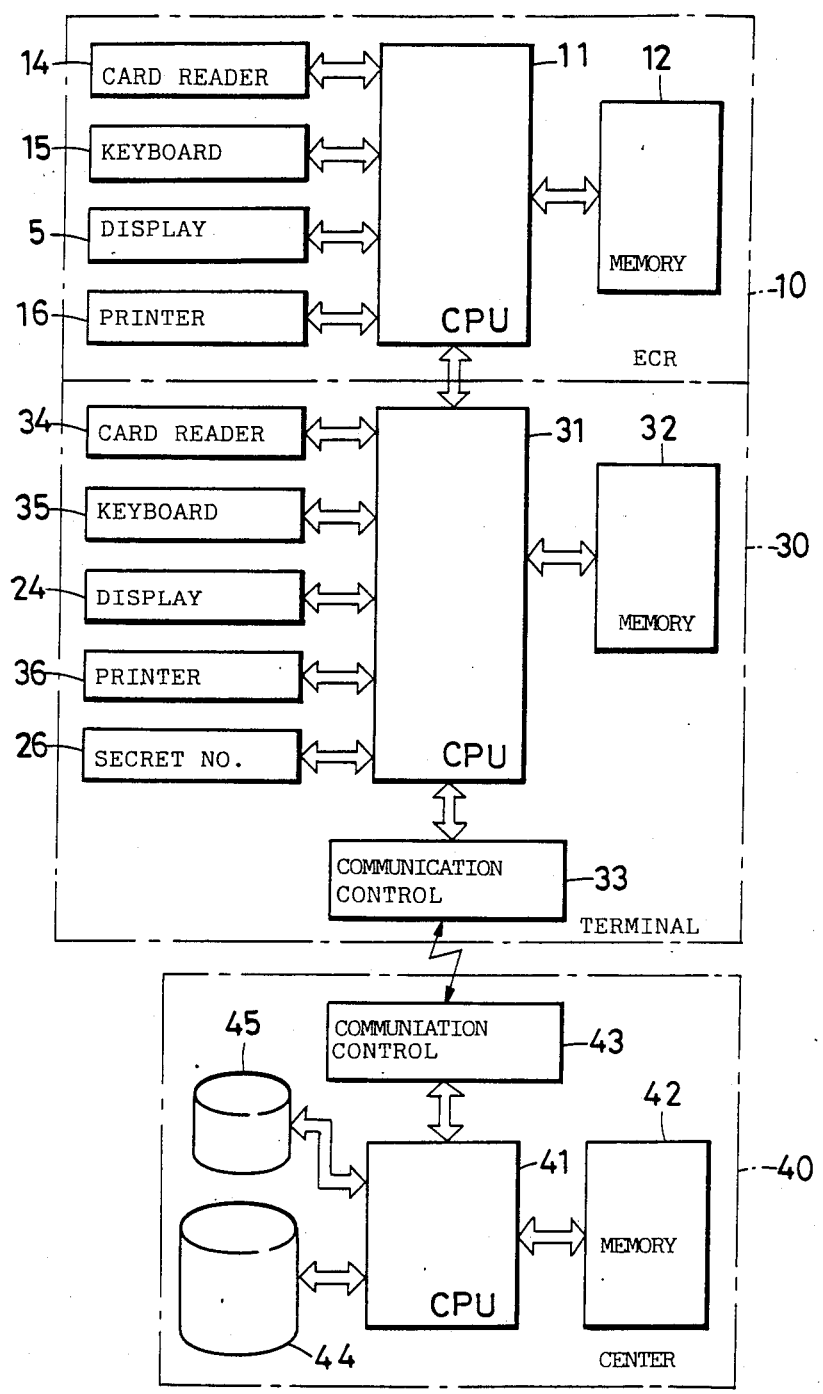
FIG. 3 is block diagram showing an overall system including a control center.

FIG. 3 shows an overall system including a control center. The overall system comprises the payment making system composed of the cash register 10 and the terminal device 30, and a control center 40 at the bank concerned which is connected to the component system by a communication line.

The cash register 10 and the terminal device 30 are controlled by central processing units (CPU's), such as microprocessors 11 and 31, including memories 12 and 32, respectively. These CPU's are interconnected by a bus. The CPU 11 of the cash register 10 has connected thereto a card reader 14 for reading the data magnetically recorded in the bank card BC, the above-mentioned keyboard 15 and display 5, and a printer 16 for printing transaction data on receipts and a journal. The CPU 31 of the terminal device 30 has connected thereto a card reader 34 for reading the bank card data, the above-mentioned keyboard 35 and display 24, a printer 36 for printing transfer data on receipts and a journal, the above-mentioned keyboard 26 and a communication control unit 33 for communication with the control center 40, The control unit 33 includes an automatic dialing circuit and a modem. The automatic dial function can be dispensed with when the terminal device is so connected as to be in communication with the center 40 at all times.

Although the card readers 14, 34 of the present embodiment are of the manual scanning type, automatic scanning readers are of course usable. In this case, card insertion inlets are formed instead of the scanning grooves 4, 23 (FIG. 1). It is of course possible to connect a plurality of electronic cash registers to a single terminal device.

The control center 40 has a large CPU 41 for controlling communication between the center and terminal devices 30 and executing various transaction processes including a transfer process. The CPU 41 is provided with a memory 42 for storing programs for executing the processes and various items of data necessary for the transaction processes, a communication control unit 43 for controlling the communication with the terminal devices, a customer information file (CIF) 44 and a transaction record file 45.

According to the present embodiment, each of the banks concerned has such a control center, and the terminal device performs communication with the center at the bank which is commonly used by the user and the store. A single control center may be provided with the CIF's of a plurality of banks for all the terminal devices to communicate with this center only. Alternatively, the center of one bank may communicate with the center of another bank for the transmission of transaction data.

Figure 4:
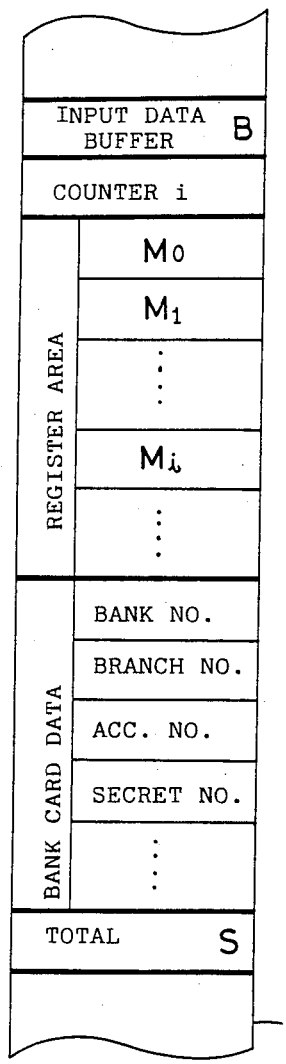
FIG. 4 shows part of a memory included in an electronic cash register.

The memory 12 of the electronic cash register 10 also has stored therein the program to be executed by the CPU 11 and possesses areas for storing the data needed for registration. FIG. 4 shows some of the data areas. Stated more specifically, the memory 12 has a buffer B for temporarily storing the data keyed in for each commercial article, a registration (register) area for storing transaction data for one user (customer), a counter i for specifying each storage location Mi of the registration area, an area for storing the data read from the bank card BC, an area for storing the total sum S for one user, etc. The buffer B or counter i can of course be replaced by a register within the CPU 11. The registration area has such a large number of storage locations Mi that every detail of a single transaction by one user can be covered thereby.

Figure 5:
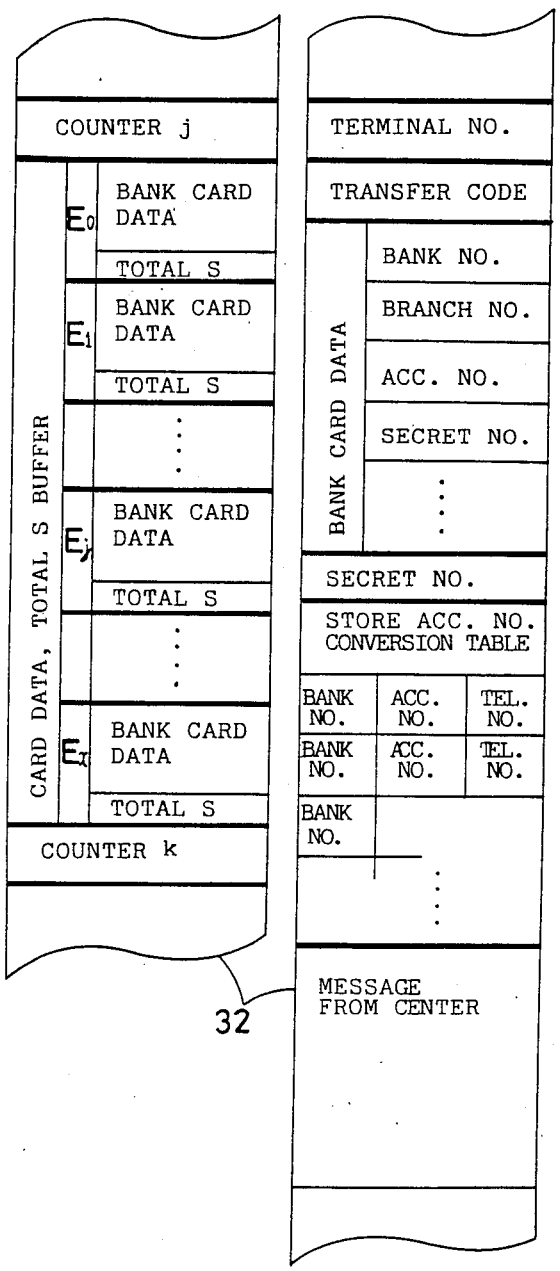
FIG. 5 shows part of a memory included in a payment making terminal device.

FIG. 5 shows some areas of the memory 32 of the terminal device 30 for storing data needed for the payment process. The memory 32 also has stored therein the program to be executed by the CPU 31. The left section of FIG. 5 shows a buffer for storing the bank card data and total sum S forwarded from the cash register 10 and paired. The buffer has a large number of areas Ej for storing paired items of data. The number x of the areas Ej is so large as to fully store pairs of data items successively sent from the cash register 10 for usual transactions and payments. Also provided are counters J and k for specifying or searching a particular area Ej in the buffer.

As shown in the right section of FIG. 5, the memory 32 has stored therein a terminal number for identifying the terminal device and the transer code to be edited into the message to be sent to the center 40. The memory 32 further has areas for storing the bank card data read by the card reader 34, secret number entered by the keyboard 26 and message sent from the center 40. Also provided is a bank number/store account number conversion table. The store has deposit accounts with a plurality of banks. The conversion table is used for searching the account number of the account opened with a particular bank with reference to the bank number given by the bank card data. The conversion table also has stored therein the telephone number of the control center of each bank. If the bank card has recorded therein the telephone number of the control center of the bank concerned, the telephone number need not be given in the conversion table.

Figure 6:
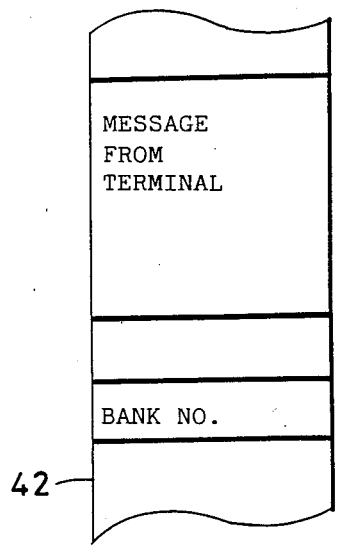
FIG. 6 shows part of a memory provided at the control center.

FIG. 6 shows part of the memory 42 provided at the center 40. The memory 42 has stored therein the bank number of the bank and includes an area for storing the message sent from the terminal device 30.

Figure 7:
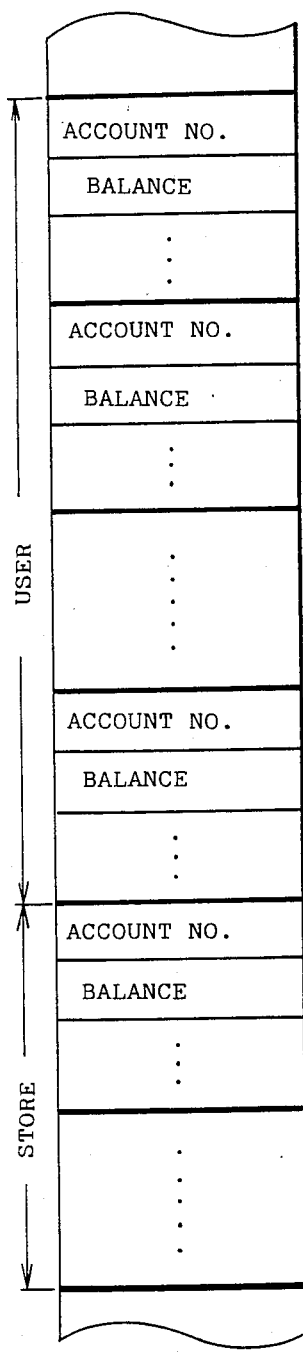
FIG. 7 shows part of a customer information file.
Figure 8:
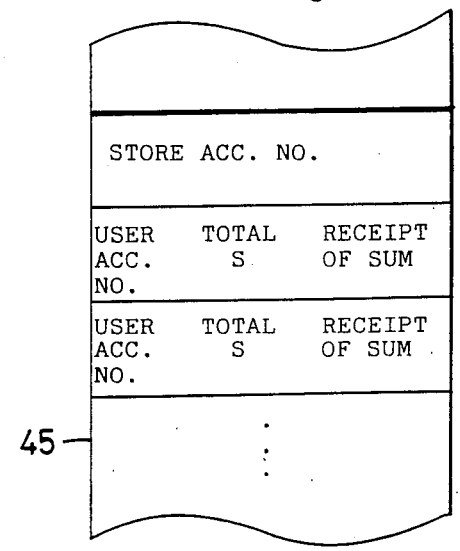
FIG. 8 shows part of a transaction record file.

FIG. 7 shows part of the CIF 40, which has stored therein for each of the users (customers) and stores having an account with the bank data relating to transactions and including the account number, deposit balance, name, address, etc. The transaction record file 45 serves to record the data relating to all transaction processes executed by the center 40. FIG. 8 shows the data items to be recorded for the payment process. It is desireable to record for the account number of each store (or store code) the account numbers of all the users for whom payments were made to the store (or the identification codes, if any, of the users), sums S paid and indication of payment (receipt of money). The data indicates the payment made by a particular user to the store. Such payment relating data may be stored in the storage area assigned each store in the CIF 44.

FIG. 9 shows an example of the message to be sent from the terminal device 30 to the control center 40. The message comprises start of text (STX), the number of the terminal device sending the message, a code designating transfer service, the account number of the store, the sum of payment (total sum) S, the bank number, branch number and account number of the user read from the bank card BC, and end of text (ETX).

Figure 10:
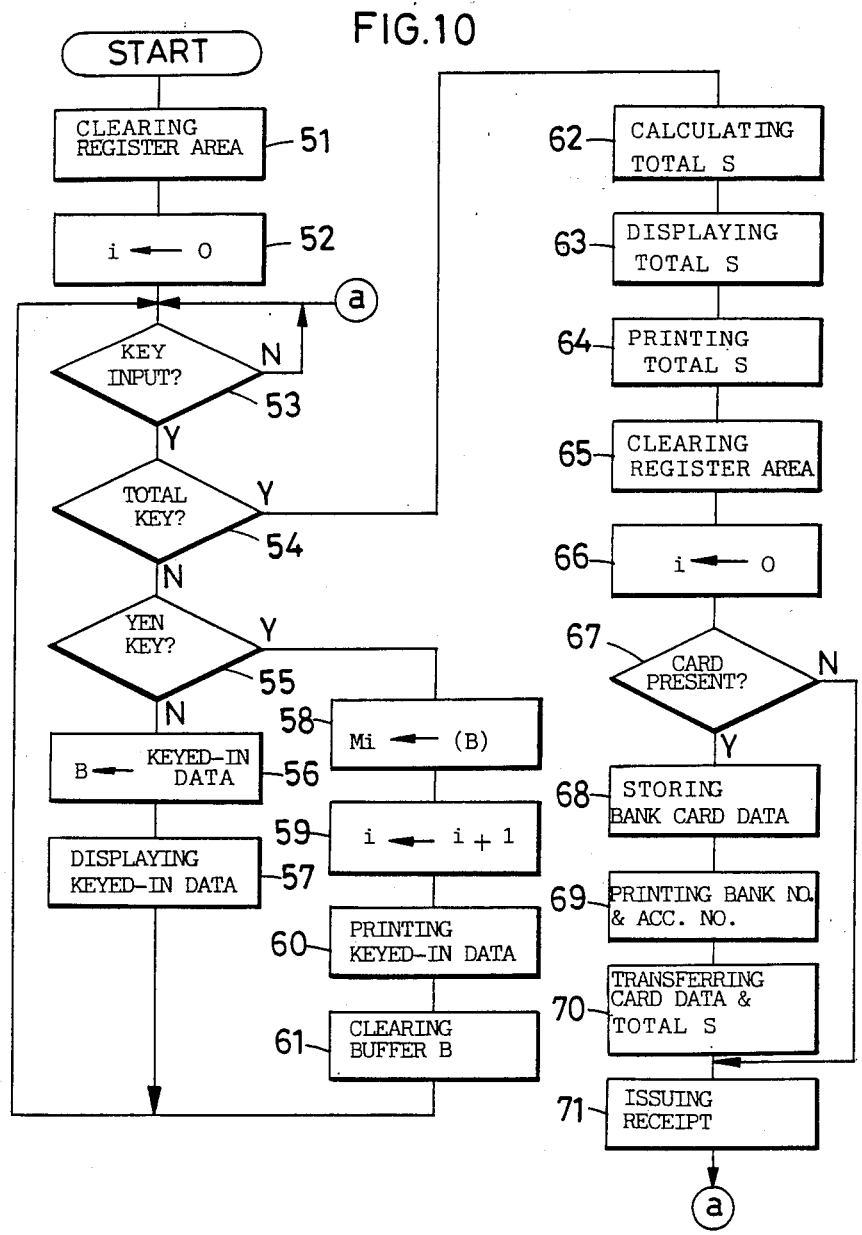
FIG. 10 is a flow chart showing the processing procedure to be followed by the electronic cash register.

FIG. 10 shows the processing procedure to be executed by the electronic cash register. Steps 51 to 66 shown are exactly the same as those executed for the usual registration service. For the sake of simplicity, however, the drawing shows a simplified process. For example, when the user purchased a plurality of the same articles, the goods code, unit price and number of the articles are entered, whereby registration for the goods is completed, but FIG. 10 does not show this procedure.

The registration area and counter i are cleared in steps 51 and 52 for initialization. When the clerk depresses a key on the keyboard 15 (step 53), the key is identified; which of the total key, yen key and other keys (e.g. goods key and numerical key) it is is checked (steps 54 and 55). When a goods key or numerical keys are depressed, the keyed-in data is stored in the buffer B (step 56) and shown on the display 5 (step 56). Usually, the clerk enters the kind of goods purchased by the user with one of the goods keys 1 and then enters the price of goods with numerical keys 2. Accordingly, every time the clerk enters an article of goods X and price YZ yen, steps 53 to 57 are repeated, and the items of data are successively shifted to and stored in the buffer B and are shown on the display 5.

The registration scanning for one kind of goods is finalized by depression of the yen key, with "YES" for step 55, which is followed by step 58. The goods and price data temporarily stored in the buffer B is transferred to the storage location Mi in the registration area specified by the counter i (step 58), and the counter i is advanced by +1 (step 59). The data in the buffer B is printed by the printer 16 on a receipt slip and journal, which are adavanced by one line for further printing (step 60). The buffer B is thereafter cleared (step 61).

The yen key is provided to distinguish the input of the sum for the selected goods from the input of the sum for the goods to be selected next. In place of the yen key and goods keys, a plurality of group keys may be used, such that every time one of the group keys is depressed, the sum is registered in a registration area provided for the group based on the code corresponding to the group. Thus the articles purchased are classified into groups with corresponding sums, and the results are printed on a receipt slip or the journal. Since this procedure is well known in the case of electronic cash registers, a detailed description will not be given. When the cash register is provided with a price look-up key (PLU), the prices of goods are stored in the memory in corresponding relation to PLU codes, so that automatic totaling can be conducted without entering prices, insofar as PLU codes are entered.

When several kinds of articles are purchased by one user, the above manipulation and steps are repeated, and the items of data relating to the articles are successively stored in the corresponding ones of the registration locations Mo to Mi and printed on a receipt slip and the journal.

After all the goods purchased by the user have been registered, the clerk depresses the total key, so that the inquiry of step 54 is answered by "YES," whereupon the prices of goods stored in the storage locations concerned in the registration area are summed up to give the total S (step 62). The total sum S is shown on the display 5 (step 63) and is printed on the slip and journal (step 64). The registration area and the counter i are then cleared (steps 65 and 66).

When a plurality of same articles are purchased, the code and price of the article must be entered a number of times corresponding to the number of articles in the foregoing steps 53 to 61. To simplify this procedure, a unit price-number key and the group keys may be used. In this case, a combination of the unit price-number key and numerical keys is used for entering the unit price and article number first to calculate the product of the price and the number, and these numerical values are displayed. The group key concerned is then depressed, whereupon the corresponding code is shown. Subsequently the unit price, number, sum (product) and group code are printed on a receipt slip. After repeating these steps, the total key is finally depressed, whereupon the total sum of the articles purchased is calculated in step 62.

When the customer desires to use his bank card for payment, the bank card is handed over to the clerk, who in turn moves the card along the scanning groove 4, whereby the data recorded in the bank card is read by the card reader 14. The data is stored in the memory 12 (steps 67 and 68). Of course, the user may handle the card for scanning. The interrogation of step 67 is as to whether the bank card has been scanned. Upon scanning, this step 67 proves "YES," whereas if no card is scanned upon lapse of a specified period of time, the answer is "NO." It is also possible to use a key for checking whether the payment is to be made with a bank card and obtain an answer depending on the presence or absence of the key input. In this case, the key is depressed, followed by step 68, wherein the card is scanned. The data is stored in the bank card data area of the memory 12.

Generally when the bank card data is read, the card is checked as to whether or not it is normal or effective with reference to the card data. (This step is not shown.) This checking is done based on the code indicating that it is a bank card (the code is recorded in the magnetic stripe 9 although not shown in FIG. 2), card data format or the like. If the scanned bank card is found not to be normal or effective, the result is shown on the display 5, and no payment is made with the card.

When the card is found normal and effective, the bank number (or the bank code or the name of the bank) and the account number (or the name of the user) included in the card data are printed on the receipt slip and journal (step 69). The bank card data and the total sum S (sum payable) are forwarded to the terminal device 30 (step 70).

Irrespective of whether the payment is made with a bank card or cash or some other means, the printed receipt is finally issued (step 71). When cash is used, the receipt and goods are delivered to the customer in exchange with cash. When the bank card is used, either the receipt or the goods are not yet handed over to the customer.

The bank card data and the total sum (sum payable) S are forwarded from the cash register 10 to the terminal device by an interrupt process. FIG. 11 shows the interrupt process to be executed by the CPU 31. Upon permission of an interrupt, the forwarded paired data is stored in an area Ej within the data-total sum buffer specified by the counter j (step 81). The counter j is advanced by +1 (step 82), and the renewed count on the counter j is checked as to whether it is in excess of the number x of areas Ej (step 83). If j is not greater than x, the interrupt process is completed as it is. If j is greater than x, the counter j is cleared (step 84). In this case, the paired data to be forwarded next will be stored in the first area Eo. Preferably the transfer of the paired data to the memory 32 is done by direct memory access (DMA) control.

If it is impossible to prepare a sufficient number of paired data areas Ej in the paired data buffer, there arises a need to clarify the areas in which paired data remains unprocessed because the process of FIG. 11 involves the likelihood that a new pair of data items will be forward to the area still retaining unprocessed paired data. For this purpose, a flag may be provided for each area, such that the flag is set to 1 at the area where unprocessed paired data remains. When the data has been processed for payment, the flag is reset to 0. Further it is possible to provide a counter which is advanced by +1 upon receipt of paired data and reversed by −1 upon completion of payment for controlling the number of areas having unprocessed paired data stored therein.

FIG. 12 shows the process to be executed by the CPU 31. When the bank card is scanned by the clerk or the user, the card reader 34 reads the card data, which is stored in the memory 32 (step 91). The bank number and the user's account number included in the data are printed on a receipt slip and the journal by the printer 36 (step 92).

The counter k is reset to 0 (step 93), and the card data in the area Ek (initially Eo) specified by the counter k is read out (step 94). The card data read out and the card data read in step 91 are checked for matching (step 95). If the two items of data are not in match, the counter k is advanced by +1 (step 97). Until the counter k advances to x (step 96), the card data is read out from areas Ek, and the data read out is compared with the data obtained in step 91. If no match is found even when the count on the counter k has reached x, this indicates that the corresponding data has not been forwarded from the cash register (error).

When a match is found, the unprocessed paired data including the matching data is read out from the paired data buffer and is stored in a suitable buffer memory, register or a portion (not shown) of the memory. The area Ek having the paired data stored therein is cleared. The total sum S read out is shown on the display 24 (step 98).

When the user enters his secret number on the keyboard 26, the secret number is read and stored in the memory 32 (step 99). The keyed-in secret number and the secret number read from the bank card are checked for matching (step 100). If they are out of match, the process is immediately terminated. Of course, the secret number may be keyed in a number of times (e.g. twice) for correction.

When the two secret numbers are in match, the store's account number corresponding to the bank number in the bank card data and the telephone number of the center are read out with reference to the conversion table (step 101). The automatic dial key 22 is depressed (step 102), whereupon the terminal device 30 is automatically dialed to the control center of the bank concerned by the communication control unit 33 with use of the telephone number. Thus the line between the device 30 and the center 40 is connected. With reference to the terminal number and transfer code in the memory 32, the store's account number read out from the conversion table, the total sum S read out from the paired data buffer and the bank card data, a message as shown in FIG. 9 is edited and sent to the center 40 (step 103). The bank number included in the card data may be found absent from the conversion table in step 101. This case is an error. Instead of providing the automatic dial 22, the center can be automatically dialed according to a program after the data necessary for the payment process has been arranged.

FIG. 13 shows the processing procedure to be followed by the control center 40. When the message from the terminal device 30 is received (step 111), the message is stored in the memory 42 and is checked as to whether the message contains the transfer code (step 112). If it is present, step 113 follows. The absence of the transfer code indicates that the message is intended for some other transaction, so that the process specified by the message will be executed (not shown).

Step 113 checks whether the bank number given in the message is in match with the bank number stored in the memory 42. If a match is found, the CIF 44 is searched for the account number which is in match with the user's account number contained in the message (step 114). Subsequently the balance on the account concerned is read out and is compared with the sum of payment S given in the message. The sum S, if smaller than the balance, can be withdrawn. In this case, the sum S is subtracted from the balance, and the result of subtraction is stored on the corresponding account in the CIF as a renewed balance (step 116).

Next, the CIF 44 is searched for the store's account number (step 117). The sum S is added to the corresponding store's account, and the result of addition is stored on the account as a renewed balance (step 118). The sum S withdrawn from the user's account is transferred to the store's account by the procedure described above. The data relating to the payment process is recorded in the transaction record file 45 (step 119).

Finally, an OK message is edited which states that the payment has been completed and contains the data relating to the process (i.e., the data contained in the message of FIG. 9) (step 120). The message is sent to the terminal device concerned (step 121).

When the bank numbers are found to be out of match in step 113, when the account numbers of the user and store are found absent in steps 114 and 117, or when the balance is found smaller than the sum S in step 115, an NG message giving such a finding is edited (step 122) and sent to the terminal device.

Upon the terminal device 30 receiving a message from the center 40 in step 104 of FIG. 12, the message is checked as to whether it is an OK message or NG message (step 105). If it is an OK message, the transferred sum S is shown on the display 24 (step 106), and the transaction data including date, sum S, name of the store, etc. is printed on the receipt and journal by the printer 36 (step 107), and the receipt is issued (step 110). If the message is an NG message, the display 24 shows the result and when needed, the reason therefor. Such information is printed on the receipt and journal (steps 108 and 109).

Only when the payment has been made normally, the receipts issued in steps 71, 110 and the goods are handed over to the user. The receipt issued in step 110, and the receipt issued in step 71 and the goods may be checked by the clerk in the vicinity of the electronic cash register 10 and then exchanged.

Although the conversion table in the memory 32 of the foregoing embodiment has stored therein stores' account numbers in corresponding relation to bank numbers, the account numbers may be replaced by codes corresponding to the account numbers so that the code will be transmitted to the center. In this case, a table for converting the codes to the account numbers is stored in the memory 42 at the center to convert the transmitted code to the corresponding account number for use in the transfer process.

What is claimed is:

1. A system for making payments for transactions comprising:
    (A) an electronic cash register comprising:
        means for entering data relating at least to the prices of goods,
        means for calculating the total sum of the prices entered as the sum to be paid, and
        a first card reader for reading data from bank cards each having recorded therein at least data relating to the account number of the holder of the card, data relating to the bank where the account is opened and data for identifying the holder, and
    (B) a payment making terminal device connected to the electronic cash register for connection with a control center provided with a file having stored therein data relating to the accounts of users and stores and with the function of transferring sums payable from the accounts of users to the accounts of stores, the terminal device comprising:
        first memory means for storing paired data transferred from the electronic cash register and including the bank card data and sum payable, a second card reader for reading the data recorded in the bank card,
        means for searching the first memory means for paired data including the card data which has a predetermined relationship with respect to the data read by the second card reader,
        second memory means having stored therein data relating to the account numbers of a plurality of stores,
        means for reading out data from the second memory means relating to the account number of a selected store, and
        means for transmitting to the control center data relating at least to the account number of the user and the sum payable and data relating to the account number of a selected store read out from the second memory means.

2. A system as defined in claim 1 wherein the terminal device is provided with a display for showing at least the sum payable.

3. A system as defined in claim 1 wherein the terminal device is provided with a printer for printing data relating to a payment from a user to a selected store and transmitted from the control center.

4. A system as defined in claim 1 wherein the terminal device is provided with means for entering data for identifying the holder of the bank card, and means for checking for a predetermined relationship between the identifying data included in the card data read by the second card reader and the identifying data entered by the entering means.

5. A system as defined in claim 1 wherein, when a selected store has deposit accounts with a plurality of banks, said second memory means has stored therein data relating to the account numbers of the store in corresponding relation to the plurality of banks, said system further comprising means for selecting a store account based on the data recorded in the bank card and identifying the bank, the terminal device including means for communication with the control center of the bank identified in the bank data recorded in said card.

6. An electronic cash register comprising:
    means for entering data relating to goods and including the prices of the goods,
    means for calculating the total sum of the prices entered as the sum to be paid,
    a card reader for reading data from bank cards each having recorded therein at least data relating to the account number of the holder of the card, data relating to the bank where the account is opened and data for identifying the holder,
    means for storing the data entered and relating to goods, the calculated total sum and read card data, and
    means for sending, for completion of payment, to means for making payments paired data including the bank card data and a sum to be paid with use of the bank card.

7. A terminal device for making payments which is connectable to an electronic cash register and further connectable to a control center provided with a file having stored therein data relating to accounts of users and accounts of stores with the function of transferring sums payable from the accounts of users to the accounts of stores, the terminal device comprising:
- first memory means for storing paired data transferred from an electronic cash register and including data recorded in bank cards and a sum payable,
- a card reader for reading the data recorded in the bank card,
- means for searching the first memory means for paired data including the card data which has a predetermined relationship with respect to the data read by the car reader,
- second memory means having stored therein data relating to the account numbers of the stores,
- means for reading out data from the second memory means relating to the account number of a selected store,
- means for transmitting to the control center data relating at least to the account number of the user and the sum payable and data relating to the account number of the selected store read out from the second memory means, and
- a printer for printing data relating to a payment from a user to a selected store transmitted from the control center.

8. A terminal device as defined in claim 7 which is provided with a display means for showing at least the sum payable.

9. A terminal device as defined in claim 7 which is provided with means for entering data for identifying the holder of the bank card, and means for checking for a predetermined relationship between identifying data included in the card data read by the card reader and the identifying data entered by the entering means.

10. A system for making payments for transactions comprising:
- means for entering data relating at least to the prices of goods;
- means for calculating the total sum of the prices entered as the sum to be paid;
- a card reader for reading data from bank cards, each having recorded therein at least data relating to the account number of the holder of the card, data relating to the bank where the account is opened and data for identifying the holder;
- means for communicating with a control center provided with a file having stored therein data relating to the accounts of users and accounts of stores, said control center transferring sums payable from the accounts of users to the accounts of stores, said communicating means comprising:
- memory means having stored therein data relating to the acount nubmers of the stores;
- means for reading out data from the memory means relating to the account number of a selected store; and
- means for transmitting to the control center data relating at least to the account number of the user, and the sum payable, and data relating to the account number of the store read out from the memory.

11. A terminal device for making payments which is connectable to an electronic cash register and further connectable to a control center provided with a file having stored therein data relating to accounts of users and accounts of stores with the function of transferring sums payable from the accounts of users to the accounts of stores, the terminal device comprising:
- memory means for storing paired data transferred from an electronic cash register and including data recorded in bank cards and a sum payable,
- a card reader for reading the data recorded in the bank card,
- means for searching the memory means for paired data including the card data which has a predetermined relationship with respect to the data read by the card reader,
- means for transmitting to the control center data relating at least to the account number of the user and the sum payable retrieved by said searching means and data relating to an account numer of a store, and
- a printer for printing data relating to a payment from a user to a store transmitted from the control center.

12. A system for making payments for transactions comprising:
- first means for setting data relating to a sum payable;
- a card reader for reading data from bank cards, each having recorded therein at least data relating to the account number of the holder of the card;
- second means for setting data relating to an account number of a store; and
- means for communicating with a control center provided with a file having stored therein data relating to the accounts of users and accounts of stores, said control center transferring sums payable from the accounts of users to the accounts of stores, said communicating means comprising means for transmitting to the control center data relating at least to the account number of the user, the sum payable and data relating to the account number of the store.

* * * * *